(12) United States Patent
Fujisawa et al.

(10) Patent No.: US 12,338,081 B2
(45) Date of Patent: Jun. 24, 2025

(54) CONVEYING DEVICE AND ROBOT SYSTEM

(71) Applicant: KAWASAKI JUKOGYO KABUSHIKI KAISHA, Kobe (JP)

(72) Inventors: Shinichi Fujisawa, Kobe (JP); Tatsutoshi Asato, Kobe (JP); Junji Ito, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 350 days.

(21) Appl. No.: 18/016,044

(22) PCT Filed: Jul. 6, 2021

(86) PCT No.: PCT/JP2021/025448
§ 371 (c)(1),
(2) Date: Jan. 13, 2023

(87) PCT Pub. No.: WO2022/014409
PCT Pub. Date: Jan. 20, 2022

(65) Prior Publication Data
US 2023/0339704 A1    Oct. 26, 2023

(30) Foreign Application Priority Data
Jul. 13, 2020  (JP) .................. 2020-119909

(51) Int. Cl.
*B25J 9/10*       (2006.01)
*B65G 47/90*      (2006.01)

(52) U.S. Cl.
CPC ............ *B65G 47/902* (2013.01); *B25J 9/106* (2013.01); *B65G 47/905* (2013.01)

(58) Field of Classification Search
CPC ....... B65G 47/902; B65G 47/905; B25J 9/106
See application file for complete search history.

(56) References Cited

U.S. PATENT DOCUMENTS

2007/0243075 A1* 10/2007 Hirose ............... B25J 9/0096
                                                    417/217
2019/0300295 A1* 10/2019 Malivoir ............ B65G 47/904
2022/0032415 A1*  2/2022 Ikeda ................... B23Q 7/046

FOREIGN PATENT DOCUMENTS

| JP | 63278739 A | * | 11/1988 |
| JP | S63-278739 A | | 11/1988 |
| JP | 07002357 A | * | 1/1995 |
| JP | 10047444 A | * | 2/1998 |

(Continued)

*Primary Examiner* — Gerald McClain
(74) *Attorney, Agent, or Firm* — Oliff PLC

(57) ABSTRACT

A conveying device includes a first link that includes a first connecting part, a second connecting part, and a first holder part located opposite the second connecting part with respect to the first connecting part, a second link that includes a third connecting part rotatably connected with the first connecting part, and operates to rotate the third connecting part about a first reference point, a third link that includes a fourth connecting part rotatably connected with the second connecting part and operates to rotate the fourth connecting part about a second reference point, and a first drive that operates the links. The links move the first holder part between a first point and a second point opposite each other with respect to the first reference point so that the first holder part approaches the first reference point in association with operation of the second link.

13 Claims, 11 Drawing Sheets

(56) References Cited

FOREIGN PATENT DOCUMENTS

| JP | H10-047444 | A | | 2/1998 | |
|----|------------|---|---|--------|---|
| JP | 3884770 | B2 | * | 2/2007 | |
| JP | 3980490 | B2 | * | 9/2007 | |
| JP | 5044138 | B2 | | 10/2012 | |
| JP | 2015044638 | A | * | 3/2015 | |
| JP | 2017043477 | A | * | 3/2017 | .......... B25J 11/0075 |

* cited by examiner

CONVEYING DEVICE AND ROBOT SYSTEM

CROSS-REFERENCE TO RELATED APPLICATION

This application claims the priority and the benefit to Japanese Patent Application No. 2020-119909 filed on Jul. 13, 2020 with the Japan Patent Office, the entire contents of which are incorporated herein as a part of this application by reference.

TECHNICAL FIELD

The present disclosure relates to a conveying device and a robot system.

BACKGROUND ART

Conventionally, various conveying devices which convey a workpiece handled by a robot are proposed. For example, Patent Document 1 discloses a conveying device which conveys a workpiece between a processing area and a loading area on the opposite side. The conveying device includes a base, a first link body coupled at one end to the base via a first joint, a second link body coupled at one end to the other end of the first link body via a second joint, and a holder part disposed at the other end of the second link body. The conveying device operates the second joint so that the second link body is bent to the first link body, and operates the first joint so that the first link body is rotated, to convey the workpiece held by the holder part between the processing area and the loading area.

Reference Document(s) of Conventional Art

Patent Document

[Patent Document 1] JP5044138B2

DESCRIPTION OF THE DISCLOSURE

The conveying device of Patent Document 1 conveys the workpiece so that the workpiece passes through an area closer to the base than a circle on which the radius is a distance between a processing position in the processing area and the base, and a circle of which the radius is a distance between a loading position in the loading area and the base. The conveying device includes a motor which rotates the first link body. Further, the conveying device includes, inside the first link body, an interlocking mechanism which rotationally displaces the second link body to the first link body so as to be interlocked with a rotational displacement of the first link body. The interlocking mechanism is a belt drive mechanism including a pulley and a belt. Therefore, the structure for driving the first link body and the second link body in order to move the holder part becomes complicated.

One purpose of the present disclosure is to provide a conveying device and a robot system which reduce an occupying area for conveyance of an object, and simplifies a structure for moving a holder part for the object.

In order to achieve the above purpose, a conveying device according to one aspect of the present disclosure is a conveying device that holds and conveys an object, which includes a first link including a first connecting part, a second connecting part located at a position distant from the first connecting part, and a first holder part for the object located on the opposite side of the second connecting part with respect to the first connecting part, a second link including a third connecting part rotatably connected with the first connecting part, the second link being operable so that the third connecting part is rotated centering on a first reference point, a third link including a fourth connecting part rotatably connected with the second connecting part, the third link being operable so that the fourth connecting part is rotated centering on a second reference point located at a position distant from the first reference point, and a first drive that operates the first link to the third link. The first link to the third link move the first holder part between a first point and a second point that are located on opposite sides to each other with respect to the first reference point so that the first holder part approaches the first reference point in association with operation of the second link.

MODE FOR CARRYING OUT THE DISCLOSURE

Figure 1:
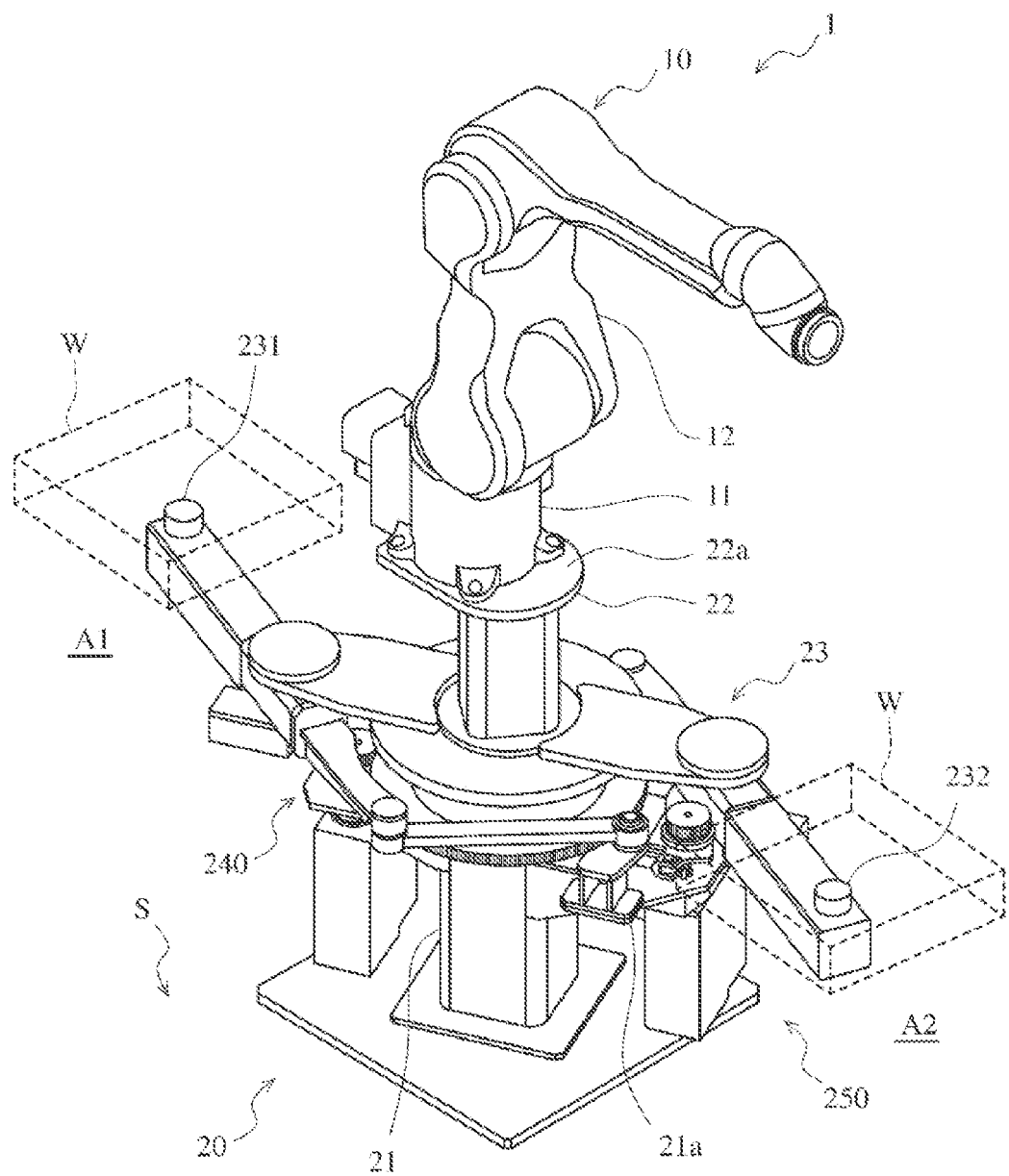
FIG. 1 is a perspective view illustrating one example of a configuration of a robot system according to an illustrative embodiment.

Hereinafter, an illustrative embodiment of the present disclosure is described with reference to the drawings. Note that the embodiment which will be described below illustrates a comprehensive or concrete example. Further, among components in the following embodiment, components which are not described in the independent claims indicating the top concept are described as arbitrary components. Each figure in the accompanying drawings is a schematic figure, and is not necessarily illustrated exactly.

Further, in each drawing, the same reference characters are assigned to substantially the same components, and therefore, redundant explanation may be omitted or simplified.

[Configuration of Robot System]

A configuration of a robot system 1 according to an illustrative embodiment is described. FIG. 1 is a perspective view illustrating one example of the configuration of the robot system 1 according to the illustrative embodiment. As illustrated in FIG. 1, the robot system 1 includes a robot 10 and a conveying device 20. The robot 10 includes a base 11 and a robotic arm 12. The robotic arm 12 is swivelably supported at a base end of the robotic arm 12 by the base 11, and an end effector is attached to a tip end of the robotic arm 12. Although not limited to this configuration, the robot 10 is an industrial robot in this embodiment. Further, the robotic arm 12 is an articulated robotic arm with multiple degrees of freedom by including a plurality of joints, and, in detail, it is a vertical articulated robotic arm. Note that the robotic arm 12 may be any type, and, for example, it may be a horizontal articulated type, a polar coordinate type, a cylindrical coordinate type, or a Cartesian coordinate type. The number of joints of the robotic arm 12 may be any number.

[Configuration of Conveying Device]

A configuration of the conveying device 20 according to the illustrative embodiment is described. As illustrated in FIG. 1, the conveying device 20 conveys an object W, such as a workpiece, which is handled by the robot 10. In this embodiment, the conveying device 20 conveys the object W between two areas which are located on the opposite sides to each other with respect to the conveying device 20. For example, the two areas are a loading area A1 and a processing area A2. The processing area A2 is an area where the robot 10 processes the object W. The loading area A1 is an area where loading of the object W to the conveying device 20 and removal of the loaded object W from the conveying device 20 are performed.

The conveying device 20 is configured so that the robot 10 is placed thereon. Thus, it is possible to reduce the size of the area occupied by the robot 10 and the conveying device 20. Note that the robot 10 may be disposed at a position different from the conveying device 20.

The conveying device 20 includes a base 21, a loading part 22, and a conveying part 23. The base 21 is a part which supports the entire conveying device 20, and, in detail, it supports the loading part 22 and the conveying part 23. The base 21 is configured to be disposed on a support surface S below, which extends in the horizontal direction, such as a floor surface, and it supports the entire conveying device 20 on the support surface S. Note that the support surface where the base 21 is disposed may be any kind of support surface, without being limited to the support surface described above. For example, the base 21 may be configured to be attached to a side support surface which extends vertically, such as a wall surface, or an upper support surface which extends horizontally, in a wall-hanging state or a suspended state.

The loading part 22 includes a placement surface 22a where the base 11 of the robot 10 is placed thereon, and the base 11 is fixed to the placement surface 22a with bolts etc. The loading part 22 is disposed on an upper part of the pillar-shaped base 21. The base 21 extends in the up-and-down direction which is a direction perpendicular to the support surface S. In this embodiment, "up" and "above" mean an upper direction along the direction perpendicular to the support surface S, and "down" and "below" mean a lower direction along the direction perpendicular to the support surface S.

The conveying part 23 includes two holder parts 231 and 232, a revolution mechanism 240, and an autorotation mechanism 250. The holder parts 231 and 232 are configured to hold the object W or a table which supports the object W. In this embodiment, the holder parts 231 and 232 hold the object W etc. from below.

The revolution mechanism 240 is a mechanism which revolves the holder parts 231 and 232 around a vertical axis at a position horizontally distant from the holder parts 231 and 232 (in detail, around the base 21) along a horizontal orbit. The autorotation mechanism 250 is a mechanism which rotates the holder parts 231 and 232 around vertical axes passing through the holder parts 231 and 232.

Figure 2:
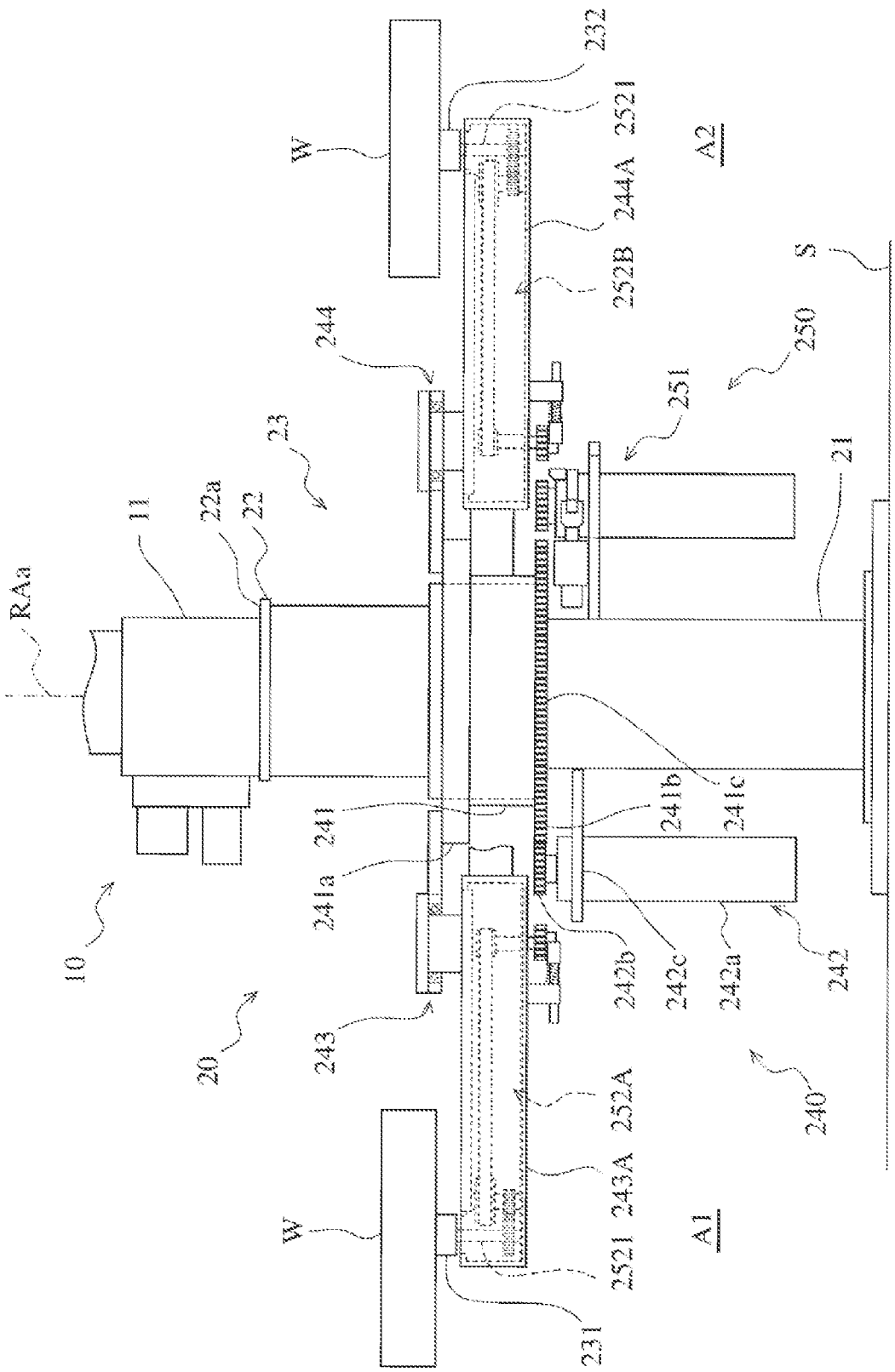
FIG. 2 is a side view illustrating one example of a configuration of a conveying device according to the illustrative embodiment.
Figure 3:
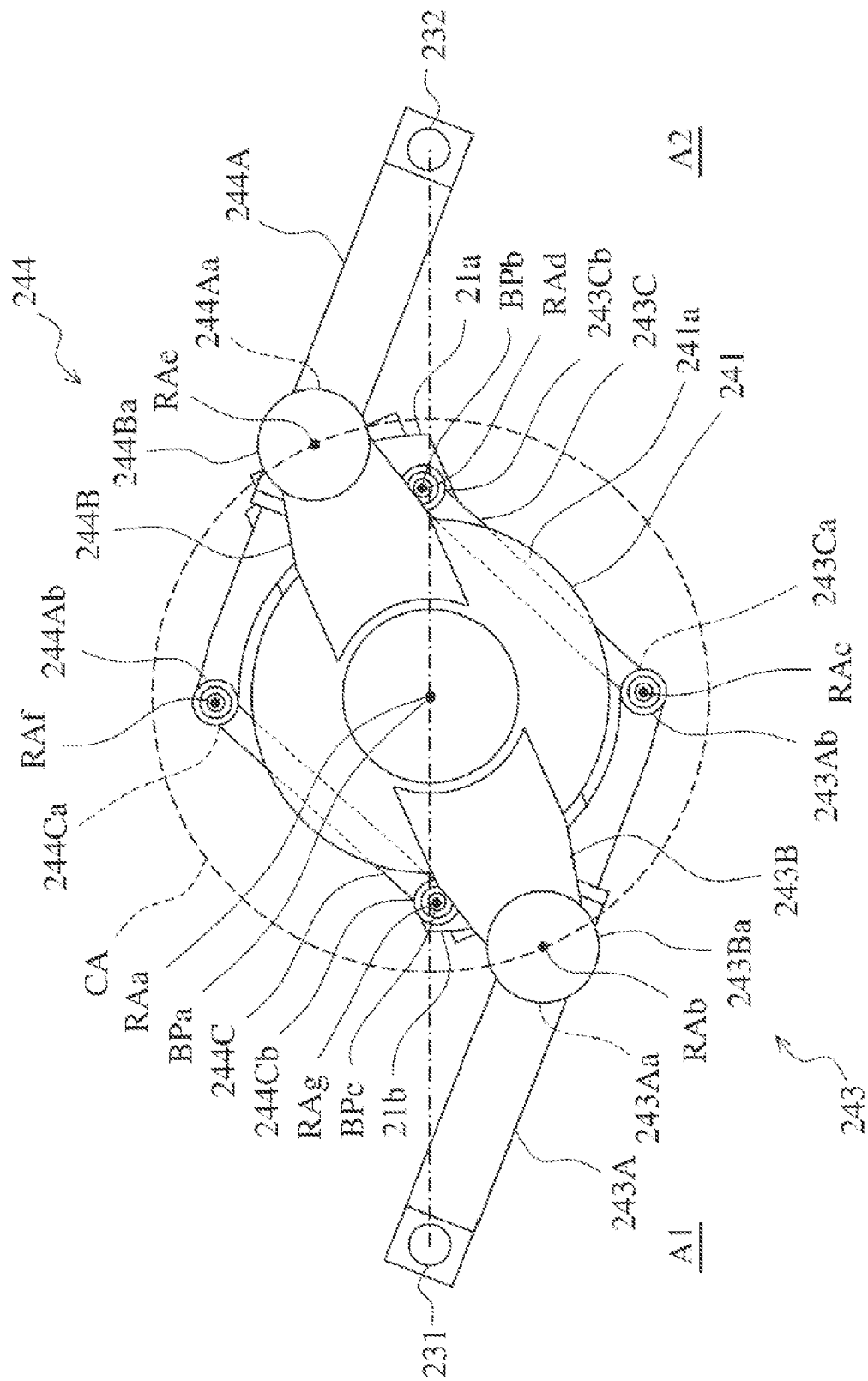
FIG. 3 is a plan view illustrating one example of the configuration of the conveying device according to the illustrative embodiment.

FIG. 2 is a side view illustrating one example of a configuration of the conveying device 20 according to the illustrative embodiment. FIG. 3 is a plan view illustrating one example of the configuration of the conveying device 20 according to the illustrative embodiment. FIG. 3 is a plan view seen from above to below. As illustrated in FIGS. 1 to 3, the revolution mechanism 240 includes a rotary body 241, a first drive 242, a first link structure 243, and a second link structure 244.

The rotary body 241 has a cylindrical shape, which engages with the base 21 penetrating vertically inside the cylinder and is supported by the base 21 so that it does not move in the up-and-down direction. The rotary body 241 is supported by the base 21 so that it rotates along an outer circumferential surface of the base 21, centering on an axis RAa which is its axial center extending vertically. The rotary body 241 integrally includes protrusions 241a and 241b which protrude radially outward from an upper end and a lower end in the direction of the axis RAa, respectively. Each of the protrusions 241a and 241b has a disk shape having the axis RAa as its axial center. Gear teeth 241c are formed in a cylindrical outer circumferential surface of the lower, the second protrusion 241b.

The first drive 242 includes a revolution motor 242a, a gear 242b which is revolved by the revolution motor 242a, and a first support 242c which holds the revolution motor 242a at the base 21. The first support 242c is fixed to the base 21. The first support 242c supports the revolution motor 242a so that the revolution motor 242a does not move with respect to the base 21. The gear 242b is disposed so that the gear teeth of its outer circumferential surface mesh with the gear teeth 241c of the rotary body 241.

The revolution motor 242a can rotate the gear 242b, and, thereby, it can rotate the rotary body 241 centering on the axis RAa. The revolution motor 242a can change the rotating direction, and, thereby, it can change the rotating direction of the rotary body 241. In this embodiment, the revolution motor 242a is a servomotor. The revolution motor 242a includes a rotation sensor, such as an encoder, which detects its rotational amount, and a current sensor or circuitry which detects its current value, and can output detection signals of the rotational amount and the current value. Although in this embodiment the first drive 242 is disposed in an area from the base 21 to the loading area A1, it may be disposed at any position.

As illustrated in FIG. 3, the first link structure 243 includes a first link 243A, a second link 243B, and a third link 243C. The first link 243A includes a first connecting part 243Aa, a second connecting part 243Ab which is located at a position distant from the first connecting part 243Aa, and a first holder part 231 which is located on the opposite side of the second connecting part 243Ab with respect to the first connecting part 243Aa. Although not limited to this configuration, the first link 243A has a pillar shape extending linearly in this embodiment. The first holder part 231 is located at one end of the first link 243A, the second connecting part 243Ab is located at the other end of the first link 243A, and the first connecting part 243Aa is located in an intermediate part of the first link 243A. The first holder part 231 is located above the first link 243A, and is supported by a first transmission shaft 2521 (see FIG. 2) extending inside the first link 243A.

The second link 243B includes a third connecting part 243Ba which is rotatably connected to the first connecting part 243Aa, and is configured to be operable so that the third connecting part 243Ba is rotated centering on a first reference point BPa. The first reference point BPa is a point on the axis RAa, and, in detail, it is a point where a plane including an upper surface of the first protrusion 241a of the rotary body 241 intersects with the axis RAa. Although not limited to this configuration, the second link 243B has a plate shape extending linearly in this embodiment. The third connecting part 243Ba is located at one end of the second link 243B, and the other end of the second link 243B is joined to the rotary body 241. The second link 243B extends radially outward of the first protrusion 241a on an upper part of the first protrusion 241a. The second link 243B rotates centering on the first reference point BPa together with the rotary body 241 to rotate the third connecting part 243Ba along a circumference of a circle CA centering on the first reference point BPa. The second link 243B and the rotary body 241 form one link which uses the first reference point BPa and the third connecting part 243Ba as a fulcrum of operation.

The third connecting part 243Ba and the first connecting part 243Aa are connected so as to be mutually rotatable centering on an axis RAb extending vertically. Although not limited to this configuration, the axis RAb is parallel to the axis RAa and intersects with the circumference of the circle CA in this embodiment. The third connecting part 243Ba and the first connecting part 243Aa form a rotary joint together.

Here, in this specification and the claims, "parallel" may include "completely parallel" and "substantially parallel." "Vertical" may include "completely vertical" and "substantially vertical."

The third link 243C includes a fourth connecting part 243Ca rotatably connected to the second connecting part 243Ab, and is configured to be operable to rotate the fourth connecting part 243Ca centering on a second reference point BPb located at a position distant from the first reference point BPa. Although not limited to this configuration, the third link 243C has a pillar shape extending linearly in this embodiment. The fourth connecting part 243Ca is located at one end of the third link 243C. The third link 243C includes a connecting part 243Cb at the other end.

The fourth connecting part 243Ca and the second connecting part 243Ab are connected so as to be mutually rotatable centering on an axis RAc extending vertically. Although not limited to this configuration, the axis RAc is parallel to the axis RAa in this embodiment. The fourth connecting part 243Ca and the second connecting part 243Ab form a rotary joint together.

The connecting part 243Cb is rotatably connected to a support part 21a included in to the base 21. The connecting part 243Cb is rotatable centering on an axis RAd extending vertically, and forms a rotary joint. Although not limited to this configuration, the axis RAd is parallel to the axis RAa in this embodiment. The axis RAd is located in a direction toward the processing area A2 from the axis RAa.

The second reference point BPb is a point on the axis RAd, and, in detail, it is a point where an upper surface of the support part 21a intersects with the axis RAd. The support part 21a is a part extending sideway from the base 21, and it is integral with the base 21 and is immovable with respect to the base 21. The connecting part 243Cb is fixed so that the position does not change with respect to the support part 21a and the base 21. Therefore, although the third link 243C is movable in a rotating direction which uses the connecting part 243Cb as a fulcrum, it is fixed so that it does not move in the three-dimensional directions with respect to the base 21.

The second link structure 244 includes a fourth link 244A, a fifth link 244B, and a sixth link 244C. The fourth link 244A includes a fifth connecting part 244Aa, a sixth connecting part 244Ab located at a position distant from the fifth connecting part 244Aa, and a second holder part 232 located on the opposite side of the sixth connecting part 244Ab with respect to the fifth connecting part 244Aa. Although not limited to this configuration, the fourth link 244A has a pillar shape extending linearly in this embodiment. The second holder part 232 is located at one end of the fourth link 244A, the sixth connecting part 244Ab is located at the other end of the fourth link 244A, and the fifth connecting part 244Aa is located in an intermediate part of the fourth link 244A. The second holder part 232 is located above the fourth link 244A, and is supported by the first transmission shaft 2521 (see FIG. 2) extending inside the fourth link 244A.

The fifth link 244B includes a seventh connecting part 244Ba rotatably connected to the fifth connecting part 244Aa, and is configured to be operable so that the seventh connecting part 244Ba is rotated centering on the first reference point BPa. Although not limited to this configuration, the fifth link 244B has a plate shape extending linearly in this embodiment. The seventh connecting part 244Ba is located at one end of the fifth link 244B, and the other end of the fifth link 244B is joined to the rotary body 241. The fifth link 244B extends in a direction different from the second link 243B, radially outward of the first protrusion 241a on the upper part of the first protrusion 241a. In this embodiment, the fifth link 244B extends in the opposite direction to the second link 243B. The fifth link 244B rotates centering on the first reference point BPa together with the rotary body 241 to rotate the seventh connecting part 244Ba along the circumference of the circle CA. The fifth link 244B and the rotary body 241 form one link which uses the first reference point BPa and the seventh connecting part 244Ba as a fulcrum of operation.

The seventh connecting part 244Ba and the fifth connecting part 244Aa are connected so as to be mutually rotatable centering on an axis RAe extending vertically. Although not limited to this configuration, the axis RAe is parallel to the axis RAa and intersects with the circumference of the circle CA in this embodiment. The seventh connecting part 244Ba and the fifth connecting part 244Aa form a rotary joint together.

The sixth link 244C includes an eighth connecting part 244Ca rotatably connected to the sixth connecting part 244Ab, and is configured to be operable so that the eighth connecting part 244Ca is rotated centering on a third reference point BPc which is located at a position distant from the first reference point BPa and the second reference point BPb. Although not limited to this configuration, the third reference point BPc is located on the opposite side of the second reference point BPb with respect to the first reference point BPa in this embodiment, and, in detail, it is disposed at a point-symmetry position with the second reference point BPb with respect to the first reference point BPa. Further, the sixth link 244C has a pillar shape extending linearly. The eighth connecting part 244Ca is located at one end of the sixth link 244C. The sixth link 244C includes a connecting part 244Cb at the other end.

The eighth connecting part 244Ca and the sixth connecting part 244Ab are connected so as to be mutually rotatable centering on an axis RAf extending vertically. Although not limited to this configuration, the axis RAf is parallel to the axis RAa, in this embodiment. The eighth connecting part 244Ca and the sixth connecting part 244Ab form a rotary joint together.

The connecting part 244Cb is rotatably connected to a support part 21b included in the base 21. The connecting part 244Cb is rotatable centering on an axis RAg extending vertically, and forms a rotary joint. Although not limited to this configuration, the axis RAg is parallel to the axis RAa in this embodiment. The axis RAg is located in a direction toward the loading area A1 from the axis RAa.

The third reference point BPc is a point on the axis RAg, and, in detail, it is a point where an upper surface of the support part 21b intersects with the axis RAg. The support part 21b is a part extending sideway from the base 21, and it is integral with the base 21 and is immovable with respect to the base 21. The connecting part 244Cb is fixed so that the position does not change with respect to the support part 21b and the base 21. Therefore, although the sixth link 244C is movable in a rotating direction which uses the connecting part 244Cb as a fulcrum, it is fixed so that it does not move in the three-dimensional directions with respect to the base 21.

Although not limited to this configuration, the fourth link 244A, the fifth link 244B, and the sixth link 244C in this embodiment include similar configurations to the first link 243A, the second link 243B, and the third link 243C, respectively. For example, the fourth link 244A has a similar shape and a similar size to the first link 243A, the fifth link 244B has a similar shape and a similar size to the second link 243B, and the sixth link 244C has a similar shape and a similar size to the third link 243C. Therefore, the first link structure 243 and the second link structure 244 are in a point-symmetrical relationship with respect to the first reference point BPa. The first link structure 243 and the second link structure 244 behave similarly, and a path on which the first link structure 243 moves the first holder part 231 and a path on which the second link structure 244 moves the second holder part 232 are in a point-symmetrical relationship with respect to the first reference point BPa.

Note that the fourth link 244A, the fifth link 244B, and the sixth link 244C may include different configurations from the first link 243A, the second link 243B, and the third link 243C. The second reference point BPb and the third reference point BPc may not be point-symmetrical with respect to the first reference point BPa.

Figure 4:
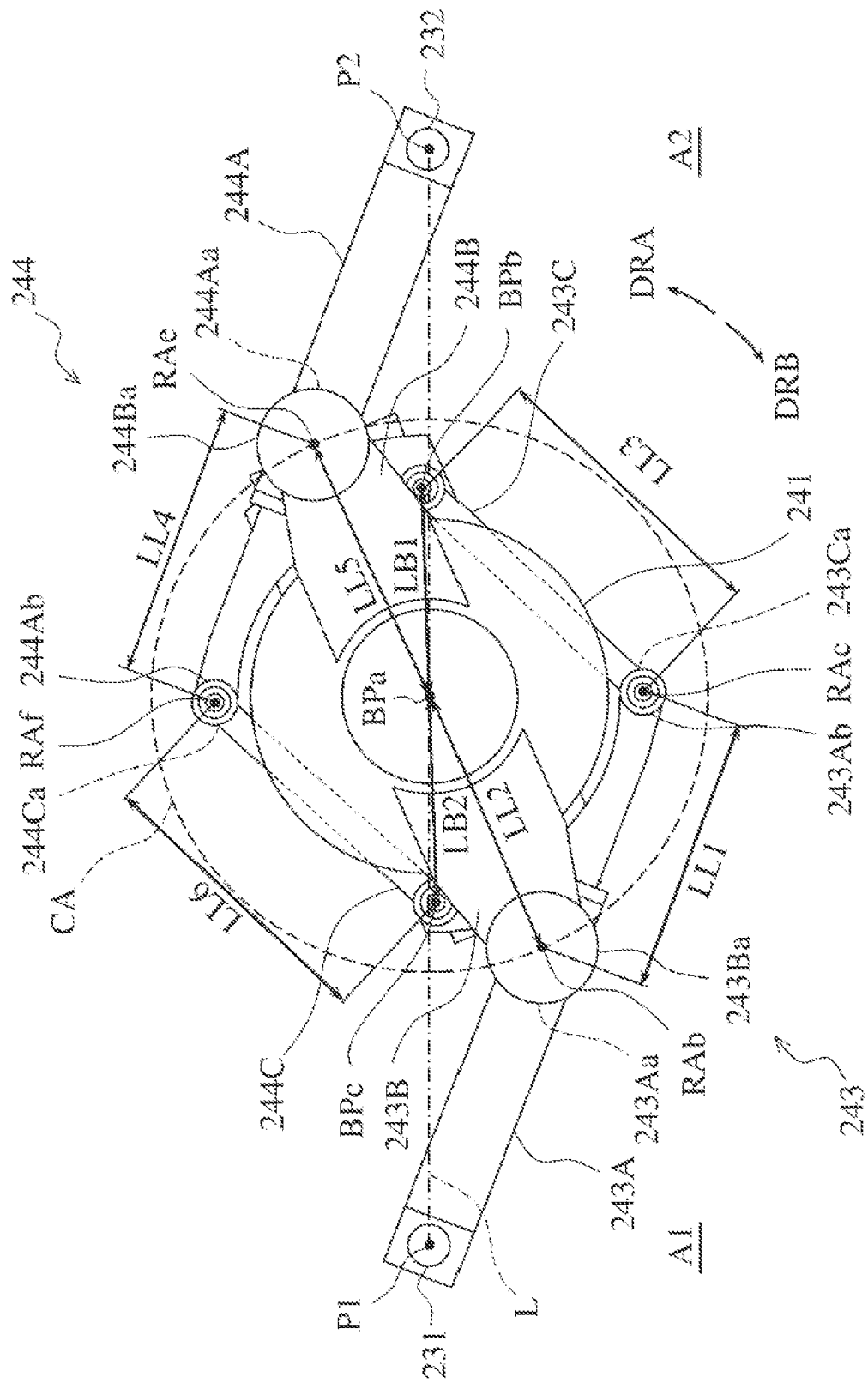
FIG. 4 is a plan view illustrating one example of a spatial relationship between reference points and connecting parts in the conveying device of FIG. 3.

FIG. 4 is a plan view illustrating one example of a spatial relationship between the reference point and the connecting part in the conveying device 20 of FIG. 3. Although not limited to this configuration, as illustrated in FIG. 4, in this embodiment, in the first link structure 243, a second link distance LL2 which is a distance between the third connecting part 243Ba and the first reference point BPa is larger than a first reference point distance LB1 which is a distance between the first reference point BPa and the second reference point BPb. For example, the second link distance LL2 is a distance between the axis RAb of the third connecting part 243Ba and the first reference point BPa. When the second link 243B rotates centering on the first reference point BPa, the third connecting part 243Ba moves on the circumference of the circle CA which passes through a location horizontally outward of the second reference point BPb, while centering on the first reference point BPa.

Further, a third link distance LL3 which is a distance between the fourth connecting part 243Ca and the second reference point BPb is larger than a first link distance LL1 which is a distance between the first connecting part 243Aa and the second connecting part 243Ab. For example, the first link distance LL1 is a distance between the axis RAb of the first connecting part 243Aa and the axis RAc of the second connecting part 243Ab. For example, the third link distance LL3 is a distance between the axis RAc of the fourth connecting part 243Ca and the second reference point BPb. When the second link 243B rotates in a rotating direction DRA centering on the first reference point BPa, the first link 243A maintains a state of having a positive angle in the rotating direction DRA centering on the axis RAc, with respect to the third link 243C. That is, in the plan view, the first link 243A maintains a state where it does not overlap with the third link 243C, and it does not cross the third link 243C. In FIG. 4, the rotating direction DRA is a counter clockwise direction, and a rotating direction DRB is a clockwise direction. The plan view is a view seen from above to below, and it illustrates the state of FIG. 4.

Similarly, in the second link structure 244, a fifth link distance LL5 which is a distance between the seventh connecting part 244Ba and the first reference point BPa is larger than a second reference point distance LB2 which is a distance between the first reference point BPa and the third reference point BPc. For example, the fifth link distance LL5 is a distance between the axis RAe of the seventh connecting part 244Ba and the first reference point BPa. When the fifth link 244B rotates centering on the first reference point BPa, the seventh connecting part 244Ba moves on the circumference of the circle CA which passes through a location horizontally outward of the third reference point BPc, while centering on the first reference point BPa.

Further, a sixth link distance LL6 which is a distance between the eighth connecting part 244Ca and the third reference point BPc is larger than a fourth link distance LL4 which is a distance between the fifth connecting part 244Aa and the sixth connecting part 244Ab. For example, the fourth link distance LL4 is a distance between the axis RAe of the fifth connecting part 244Aa and the axis RAf of the sixth connecting part 244Ab. For example, the sixth link distance LL6 is a distance between the axis RAf of the eighth connecting part 244Ca and the third reference point BPc. When the fifth link 244B rotates in the rotating direction DRA centering on the first reference point BPa, the fourth link 244A maintains a state of having a positive angle in the rotating direction DRA centering on the axis RAf, with respect to the sixth link 244C, and, in the plan view, it maintains a state where it does not overlap with the sixth link 244C, and it does not cross the sixth link 244C.

Further, in the state illustrated in FIG. 4, the first holder part 231 is located at a loading point P1 of the loading area A1, and the second holder part 232 is located at a processing point P2 of the processing area A2. Although not limited to this configuration, the processing point P2 is located at a position which is point-symmetrical with the loading point P1 with respect to the first reference point BPa in this embodiment. The first link structure 243 and the second link structure 244 are configured so as to move the first holder part 231 and the second holder part 232 between the loading point P1 and the processing point P2, respectively. The loading point P1 is one example of a first point and a fourth point, and the processing point P2 is one example of a second point and a third point.

In such a first link structure 243 and the second link structure 244, when the first holder part 231 is located at the loading point P1 and the second holder part 232 is located at the processing point P2, the second reference point BPb is located at a first distance from the second connecting part 243Ab and the sixth connecting part 244Ab, and the third reference point BPc is located at the first distance from the second connecting part 243Ab and the sixth connecting part 244Ab, on the opposite side of the second reference point BPb with respect to the first reference point BPa. Thus, the first link 243A, the second link 243B, and the third link 243C are in a point-symmetrical relationship with the fourth link 244A, the fifth link 244B, and the sixth link 244C with respect to the first reference point BPa. Further, the first reference point BPa is located at a second distance from the second connecting part 243Ab and the sixth connecting part 244Ab. The position of the second connecting part 243Ab and the position of the sixth connecting part 244Ab in the state described above are examples of a first connecting part position and a third connecting part position, respectively.

A configuration of the autorotation mechanism 250 is described. As illustrated in FIG. 2, the autorotation mechanism 250 includes a second drive 251 which selectively gives a driving force to the first holder part 231 and the second holder part 232, a first transmission part 252A which transmits the driving force of the second drive 251 to the first holder part 231, and a second transmission part 252B which transmits the driving force of the second drive 251 to the second holder part 232. The first transmission part 252A is disposed inside the first link 243A, and the second transmission part 252B is disposed inside the fourth link 244A. Since the first transmission part 252A includes a similar configuration to the second transmission part 252B, configurations of the second drive 251 and the second transmission part 252B are mainly described below, and explanation of a configuration of the first transmission part 252A is omitted.

Figure 5:
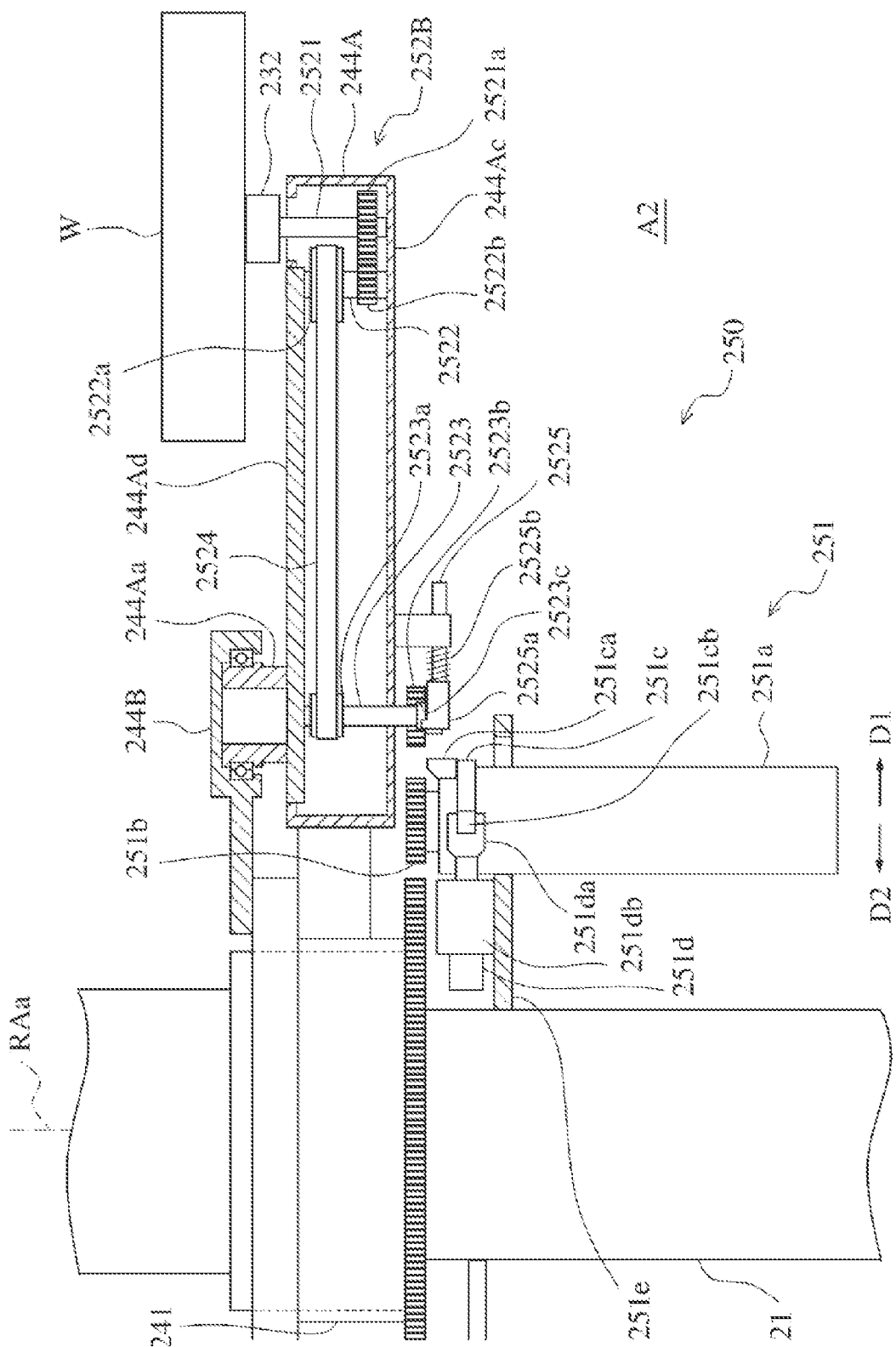
FIG. 5 is a side view illustrating one example of a configuration of an autorotation mechanism of the conveying device according to the illustrative embodiment.

FIG. 5 is a side view illustrating one example of the configuration of the autorotation mechanism 250 of the conveying device 20 according to the illustrative embodiment, and illustrates a cross-sectional side view of the fourth link 244A. FIG. 5 illustrates one example of the configurations of the second drive 251 and the second transmission part 252B. As illustrated in FIGS. 2 and 5, the second drive 251 includes an autorotation motor 251a, a gear 251b, a motor support 251c, a slide drive 251d, and a second support 251.

The autorotation motor 251a is configured to rotate the gear 251b. In this embodiment, the autorotation motor 251a is a servomotor. The autorotation motor 251a includes a rotation sensor, such as an encoder, which detects a rotational amount of the autorotation motor 251a, and a current sensor or circuitry which detects a current value of the autorotation motor 251a, and can output detection signals of the rotational amount and the current value.

The motor support 251c is configured to support the autorotation motor 251a, and to be movable in horizontal directions D1 and D2 with respect to the base 21. The direction D1 is a direction away from the base 21, and the direction D2 is a direction opposite from the direction D1 and toward the base 21. The motor support 251c includes a contact part 251ca which is oriented in the direction D1, and an engagement part 251cb which protrudes to the side.

The slide drive 251d includes an engagement part 251da which engages with the engagement part 251cb of the motor support 251c, and an actuator 251db which slides the engagement part 251da in the directions D1 and D2. The power source of the actuator 251db may be electric power, or may be other than electric power, such as pneumatic or hydraulic pressure. The actuator 251db slides the engagement part 251da to slide the motor support 251c and the autorotation motor 251a in the directions D1 and D2.

The second support 251 supports the motor support 251c and the slide drive 251d. The second support 251 is fixed to the base 21. The second support 251 supports the motor support 251c so that the motor support 251c is slidable in the directions D1 and D2 with respect to the base 21. The second support 251 supports the slide drive 251d so that the second support 251 is immovable with respect to the base 21.

The second transmission part 252B includes a first transmission shaft 2521, a second transmission shaft 2522, a third transmission shaft 2523, a transmission belt 2524, and a stop mechanism 2525. Although not limited to this configuration, all the transmission shafts 2521, 2522, and 2523 extend vertically in this embodiment. The first transmission shaft 2521 is disposed near the second holder part 232, the third transmission shaft 2523 is disposed near the fifth connecting part 244Aa, and the second transmission shaft 2522 is disposed between the first transmission shaft 2521 and the third transmission shaft 2523.

One end of the first transmission shaft 2521 extends upwardly to the outside of the fourth link 244A, and it is connected so as to rotate integrally with the second holder part 232. The second holder part 232 is supported by the first transmission shaft 2521 from below. The other end of the first transmission shaft 2521 is rotatably supported by a bottom wall 244Ac which forms the contour of the fourth link 244A. The first transmission shaft 2521 includes, near the other end, a gear 2521a which rotates integrally.

One end and the other end of the second transmission shaft 2522 are rotatably supported by a top wall 244Ad and a bottom wall 244Ac which form the contour of the fourth link 244A, respectively. The second transmission shaft 2522 includes, near one end, a pulley 2522a which rotates integrally, and includes, near the other end, a gear 2522b which rotates integrally. The gear teeth of an outer circumferential surface of the gear 2522b mesh with the gear teeth of an outer circumferential surface of the gear 2521a.

One end of the third transmission shaft 2523 is rotatably supported by the top wall 244Ad, and the other end of the third transmission shaft 2523 extends downwardly to the outside of the fourth link 244A. The third transmission shaft 2523 includes, near one end, a pulley 2523a which rotates integrally, and includes, near the other end and outside of the fourth link 244A, a gear 2523b which rotates integrally. The gear teeth of the circumferential surface of the gear 2523b are able to mesh with the gear teeth of the circumferential surface of the gear 251b.

The transmission belt 2524 is an endless loop belt, and it is wound around pulleys 2522a and 2523a so that a rotational driving force is transferable from one to the other.

The stop mechanism 2525 is configured to stop and cancel the stop of rotation of the gear 2523b of the third transmission shaft 2523. The stop mechanism 2525 includes a stop body 2525a which is engageable with an inner circumferential surface of an axial hole 2523c formed in the gear 2523b, and a biasing member 2525b which biases the stop body 2525a in the direction D2 toward the inner circumferential surface of the hole 2523c. Although in this embodiment the biasing member 2525b is a spring, it may include any kind of configuration.

In the autorotation mechanism 250 described above, when the slide drive 251d moves the autorotation motor 251a in the direction D2, the gear 251b of the autorotation motor 251a does not engage with the gear 2523b of the second transmission part 252B. The stop mechanism 2525 engages the stop body 2525a with the hole 2523c to stop the rotation of the gear 2523b. Thus, since the transmission shafts 2521, 2522, and 2523 are stopped so that they do not rotate, the second holder part 232 is fixed in the rotating direction of the first transmission shaft 2521.

When the slide drive 251d moves the autorotation motor 251a in the direction D1, the contact part 251ca of the motor support 251c pushes and moves the stop body 2525a in the direction D1 to cancel the engaging of the stop body 2525a with the hole 2523c. Further, the gear 251b of the autorotation motor 251a meshes with the gear 2523b of the second transmission part 252B. When the autorotation motor 251a drives in this state, the rotational driving force of the autorotation motor 251a is sequentially transmitted to the third transmission shaft 2523, the second transmission shaft 2522, and the first transmission shaft 2521, and rotates the second holder part 232. The object W held by the second holder part 232 is rotated on the axis of the first transmission shaft 2521. According to the rotating direction of the autorotation motor 251a, the rotating direction of the second holder part 232 may be changed.

FIGS. 2 and 5 illustrate a state where the second holder part 232 is located at the processing point P2. In this state, the second drive 251 is able to drive the second transmission part 252B, and, thereby, it can rotate the second holder part 232. Further, when the first holder part 231 is located at the processing point P2 by the operation of the conveying device 20, the second drive 251 is able to drive the first transmission part 252A similar to the second transmission part 252B, and, thereby, it can rotate the first holder part 231. The second drive 251 can selectively rotate the first holder part 231 and the second holder part 232.

[Operation of Conveying Device]

Figure 6:
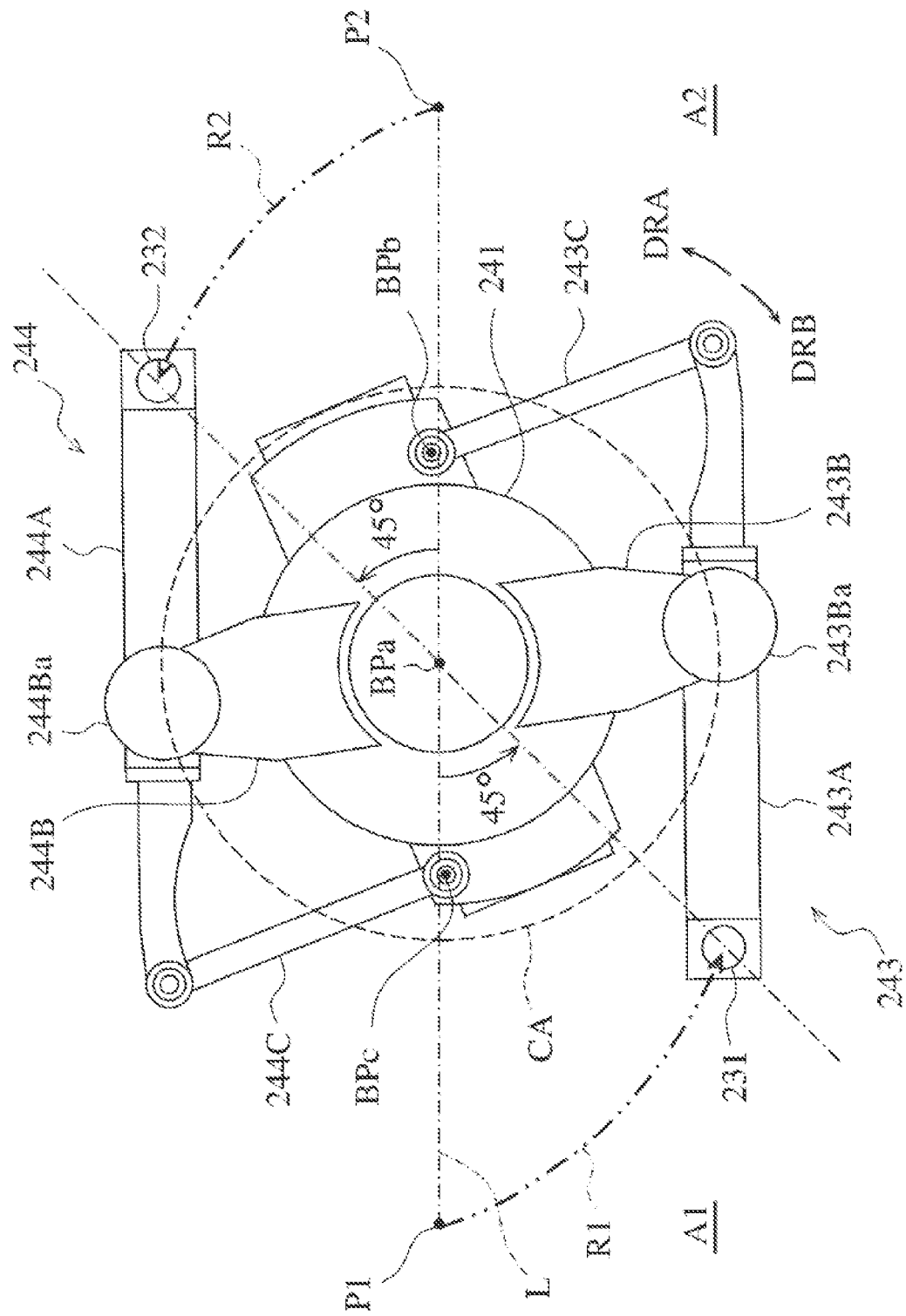
FIG. 6 is a plan view illustrating one example of a state where a holder part is rotated 45° in the conveying device of FIG. 4.
Figure 7:
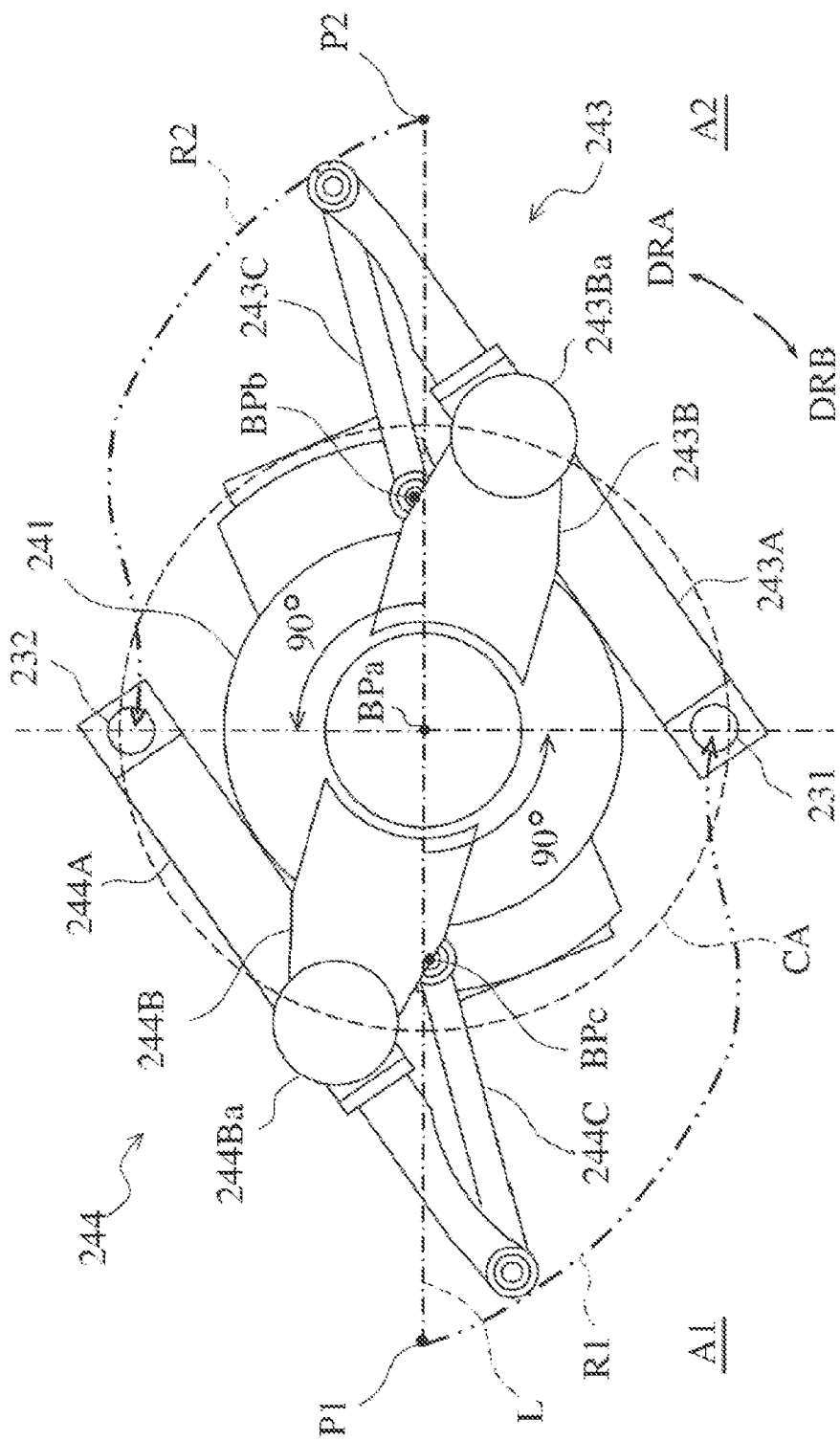
FIG. 7 is a plan view illustrating one example of a state where the holder part is rotated 90° in the conveying device of FIG. 4.
Figure 8:
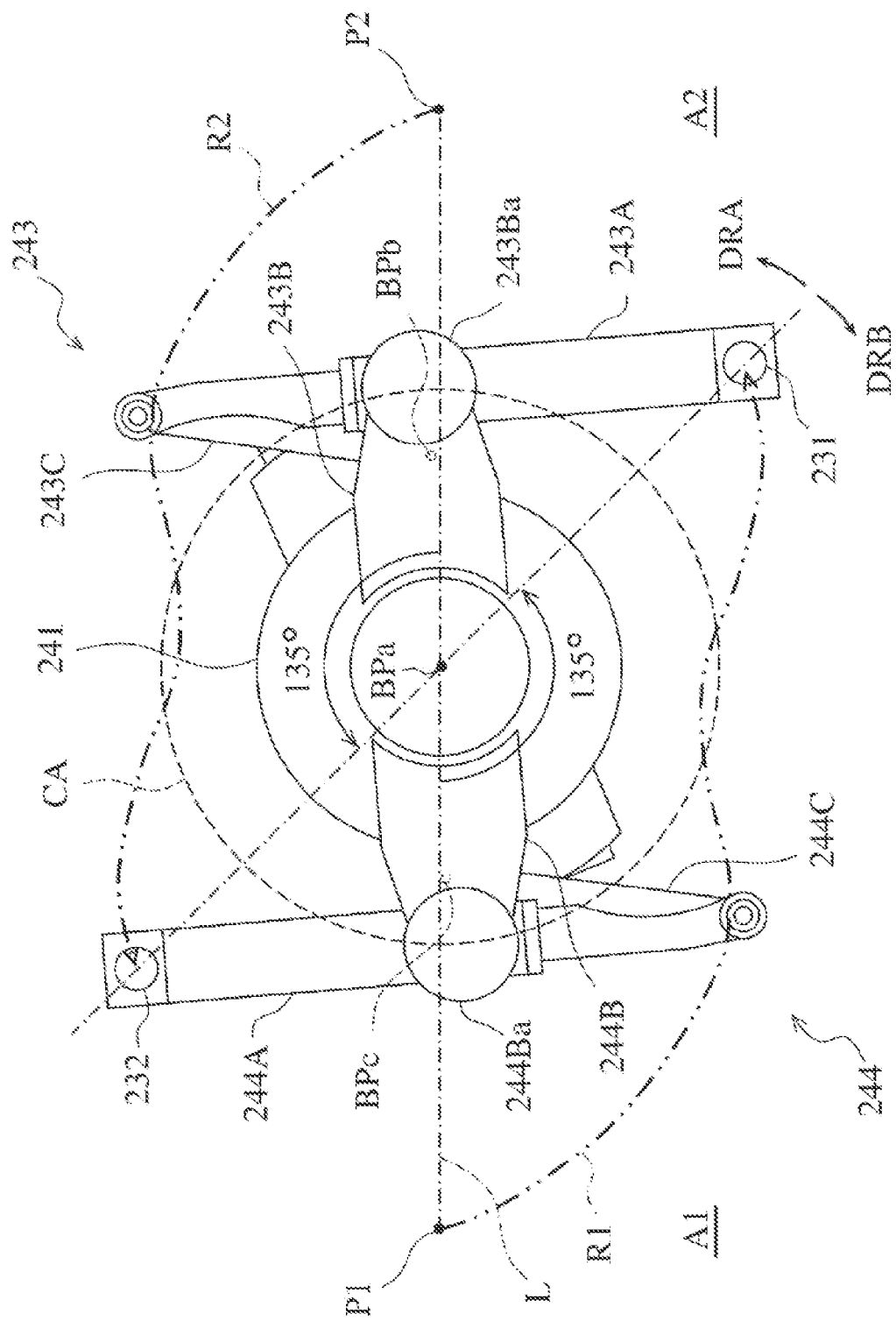
FIG. 8 is a plan view illustrating one example of a state where the holder part is rotated 135° in the conveying device of FIG. 4.
Figure 9:
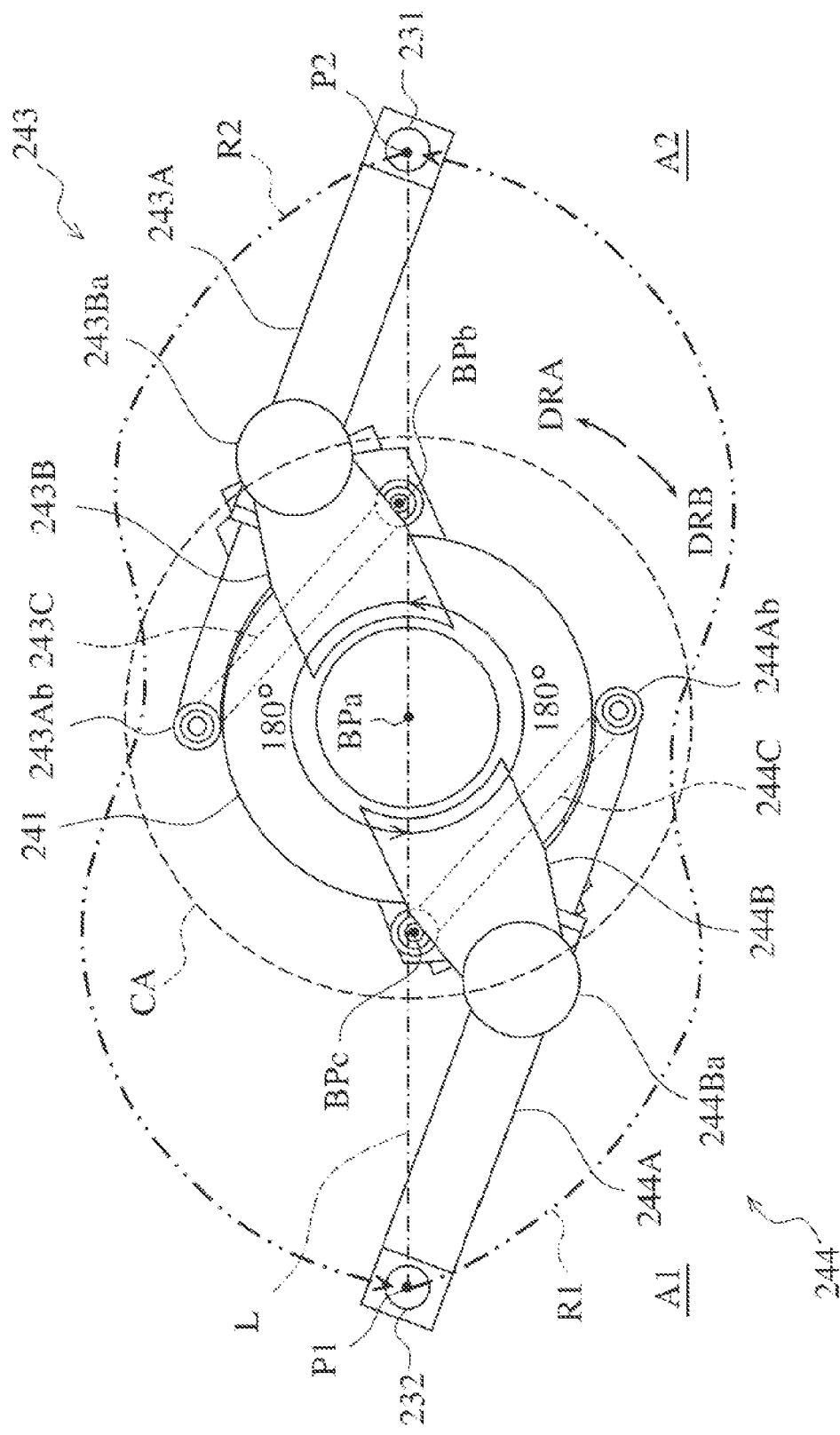
FIG. 9 is a plan view illustrating one example of a state where the holder part is rotated 180° in the conveying device of FIG. 4.

One example of operation of the conveying device 20 according to the illustrative embodiment is described. In detail, operations of the first link structure 243 and the second link structure 244 are described. FIG. 6 is a plan view illustrating one example of a state where the holder parts 231 and 232 are rotated 45° in the conveying device 20 of FIG. 4. FIG. 7 is a plan view illustrating one example of a state where the holder parts 231 and 232 are rotated 90° in the conveying device 20 of FIG. 4. FIG. 8 is a plan view illustrating one example of a state where the holder parts 231 and 232 are rotated 135° in the conveying device 20 of FIG. 4. FIG. 9 is a plan view illustrating one example of a state where the holder parts 231 and 232 are rotated 180° in the conveying device 20 of FIG. 4.

First, as illustrated in FIG. 4, in a state where the first holder part 231 is located at the loading point P1 and the second holder part 232 is located at the processing point P2, the first drive 242 drives to rotate the rotary body 241 in the direction DRA. Therefore, as illustrated in FIG. 6, the third connecting part 243Ba and the seventh connecting part 244Ba move in the direction DRA on the circumference of the circle CA. The first link 243A and the third link 243C operate so that they are bent while decreasing the interior angle, and the fourth link 244A and the sixth link 244C operate so that they are bent while decreasing the interior angle. The holder parts 231 and 232 move on arc-shaped paths R1 and R2, which gradually approach the circumference of the circle CA, respectively.

As illustrated in FIG. 7, when the rotary body 241 is further rotated from the state of FIG. 6, the holder parts 231 and 232 move on the paths R1 and R2 which go inward of the circumference of the circle CA, respectively, while the first link 243A and the third link 243C decrease the interior angle, and the fourth link 244A and the sixth link 244C decrease the interior angle. Between FIGS. 6 and 7, each of the paths R1 and R2 draws a curve including a point of inflection.

As illustrated in FIG. 8, when the rotary body 241 is further rotated from the state of FIG. 7, the holder parts 231 and 232 move on the paths R1 and R2 toward the outside of the circumference of the circle CA, respectively, while the first link 243A and the third link 243C decrease the interior angle, and the fourth link 244A and the sixth link 244C decrease the interior angle. Between FIGS. 7 and 8, each of the paths R1 and R2 draws a curve which gradually separates from the circumference of the circle CA, outside the circumference of the circle CA, and includes a point of inflection.

As illustrated in FIG. 9, when the rotary body 241 is further rotated from the state of FIG. 8, the holder parts 231 and 232 move on the arc-shaped paths R1 and R2 which gradually separate from the circumference of the circle CA, respectively, while the first link 243A and the third link 243C increase the interior angle, and the fourth link 244A and the sixth link 244C increase the interior angle. In FIG. 9, the first holder part 231 is located at the processing point P2, and the second holder part 232 is located at the loading point P1.

Therefore, by the first drive 242 rotating the rotary body 241 in the direction DRA, the first link structure 243 and the second link structure 244 operate synchronizedly so that the first link structure 243 moves the first holder part 231 from the loading point P1 to the processing point P2 along the path R1, and the second link structure 244 moves the second holder part 232 from the processing point P2 to the loading point P1 along the path R2. In the process from the state of FIG. 4 to the state of FIG. 9, the rotary body 241 rotates 180° in the direction DRA.

In the state of FIG. 9, the second connecting part 243Ab of the first link structure 243 is located at the second distance from the first reference point BPa, and is point-symmetrical with the second connecting part 243Ab in the state of FIG. 4 with respect to the first reference point BPa. A line which connects the first reference point BPa with the second reference point BPb is a perpendicular bisector of a line segment which connects the second connecting part 243Ab in the state of FIG. 9 with the second connecting part 243Ab in the state of FIG. 4. The first link 243A in the state of FIG. 9 and the first link 243A in the state of FIG. 4 are point-symmetrical with each other with respect to the first reference point BPa. The position of the second connecting part 243Ab in the state of FIG. 9 is one example of a second connecting part position.

In the state of FIG. 9, the sixth connecting part 244Ab of the second link structure 244 is located at the second distance from the first reference point BPa, and is point-symmetrical with the sixth connecting part 244Ab in the state of FIG. 4 with respect to the first reference point BPa. A line which connects the first reference point BPa with the third reference point BPc is a perpendicular bisector of a line segment which connects the sixth connecting part 244Ab in the state of FIG. 9 with the sixth connecting part 244Ab in the state of FIG. 4. The fourth link 244A in the state of FIG.

9 and the fourth link 244A in the state of FIG. 4 are point-symmetrical with each other with respect to the first reference point BPa. The position of the sixth connecting part 244Ab in the state of FIG. 9 is one example of a fourth connecting part position.

In the state of FIG. 9, when the first drive 242 rotates the rotary body 241 in the direction DRB, the first link structure 243 and the second link structure 244 operate synchronizedly so that the first link structure 243 moves the first holder part 231 from the processing point P2 to the loading point P1 along the path R1, and the second link structure 244 moves the second holder part 232 from the loading point P1 to the processing point P2 along the path R2.

The paths R1 and R2 are paths in which a spread in a direction perpendicular to the line L which connects the loading point P1 with the processing point P2 is suppressed. For example, in the process where the holder parts 231 and 232 rotate from the loading point P1 and the processing point P2 up to the angle of 135° in the direction DRA, since the first link 243A and the third link 243C decrease the interior angle and the fourth link 244A and the sixth link 244C decrease the interior angle, the paths R1 and R2 can suppress the spread in the direction perpendicular to the line L.

In the process where the holder parts 231 and 232 move between the loading point P1 and the processing points P2, the first link 243A and the third link 243C neither intersect nor overlap with each other, and the fourth link 244A and the sixth link 244C neither intersect nor overlap with each other. Thus, it is prevented that the first link 243A and the fourth link 244A excessively approach and interfere with the rotary body 241.

[Control System of Conveying Device]

Figure 10:
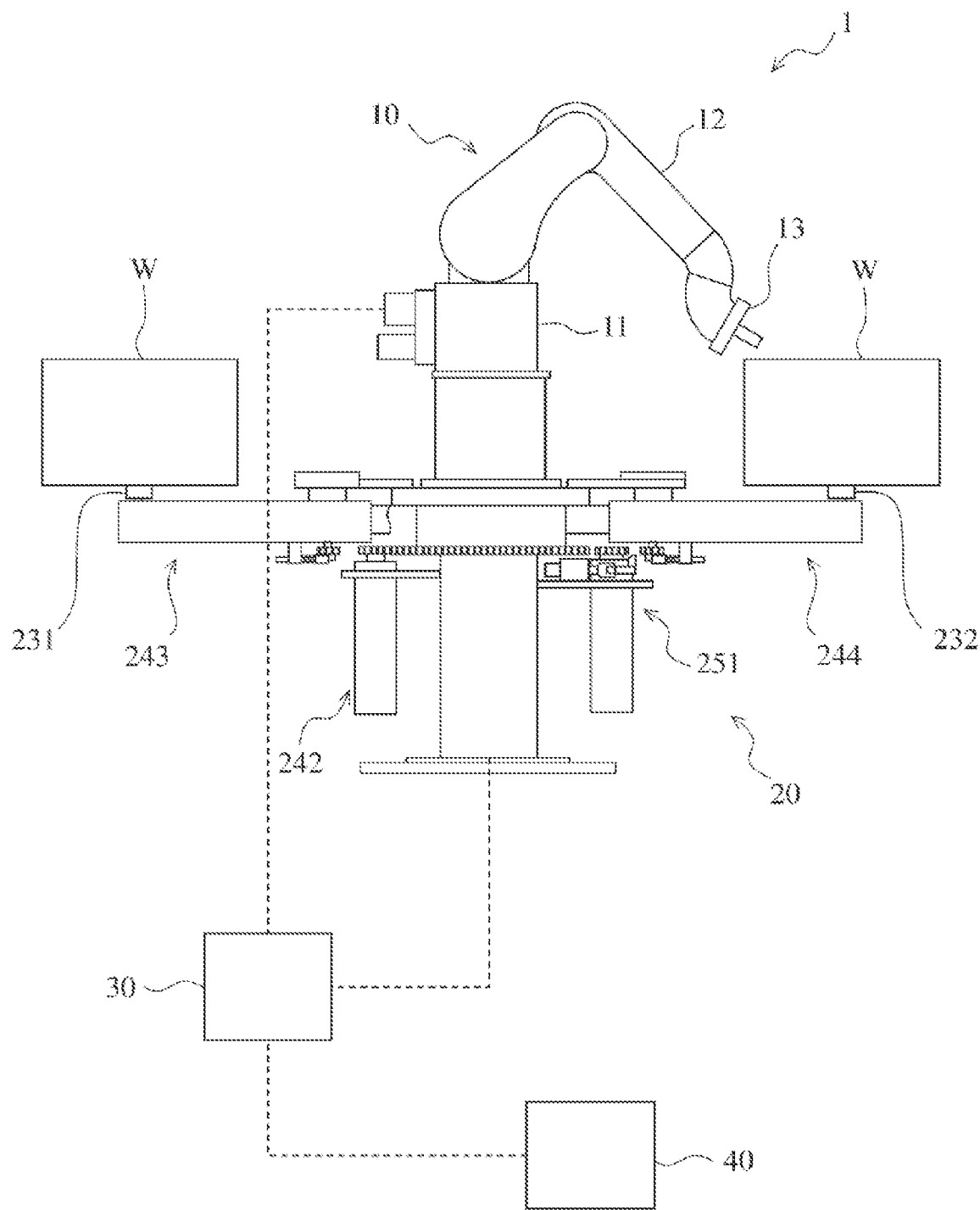
FIG. 10 is a side view illustrating one example of a configuration of a control system of a robot system according to the illustrative embodiment.
Figure 11:
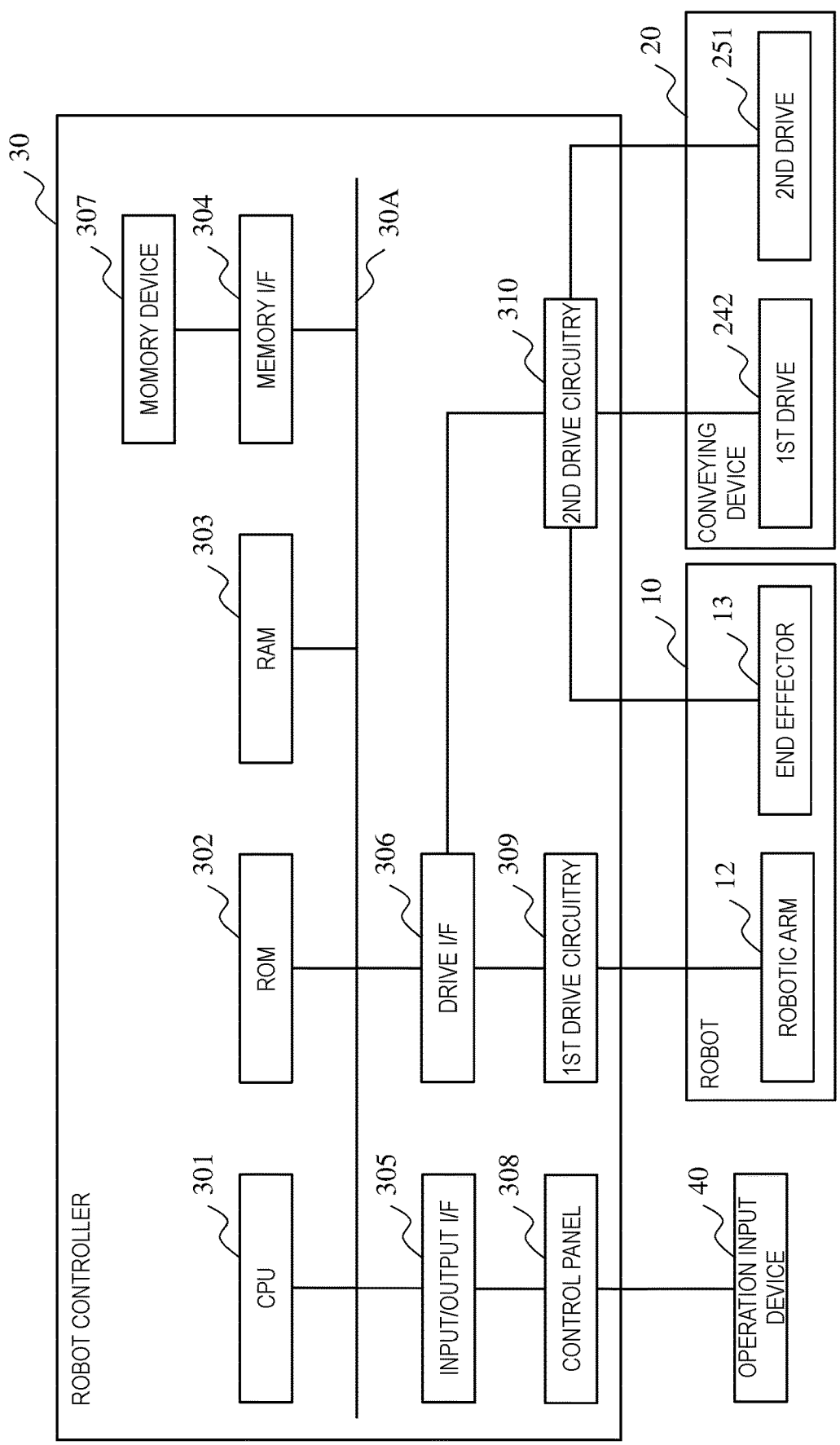
FIG. 11 is a block diagram illustrating one example of a hardware configuration of a robot controller according to the illustrative embodiment.

A control system of the conveying device 20 according to the illustrative embodiment is described. FIG. 10 is a side view illustrating one example of a configuration of the control system of the robot system 1 according to the illustrative embodiment. FIG. 11 is a block diagram illustrating one example of a hardware configuration of a robot controller 30 according to the illustrative embodiment. As illustrated in FIG. 10, the robot system 1 further includes the robot controller 30 and an operation input device 40. The robot 10 includes an end effector 13. In the example of FIG. 10, the robot system 1 is configured to perform painting to the object W. The end effector 13 is a paint gun. The conveying device 20 causes the first link structure 243 and the second link structure 244 to alternately perform a movement of a non-painted object W from the loading area A1 to the processing area A2 and a movement of the painted object W from the processing area A2 to the loading area A1.

The operation input device 40 accepts inputs of various instructions, information, data, etc., and outputs them to the robot controller 30. For example, the operation input device 40 can accept an input by a user P of the robot system 1. For example, the operation input device 40 may include a known input device, such as a lever, a button, a touch panel, a joystick, a motion capture, a camera, and a microphone. For example, the operation input device 40 may include a terminal unit, such as a teaching pendant, a smart device such as a smartphone and a tablet, a personal computer, and a dedicated terminal, which is one of a teaching device. For example, when the robot 10 is controlled by a master-slave method, the operation input device 40 may include a master unit. For example, the master unit may be configured to perform operation similar to the robotic arm 12.

The robot controller 30 controls operation of the robot 10. Although not limited to this configuration, the robot controller 30 also controls the operation of the conveying device 20 in this embodiment. The robot controller 30 processes the instruction, information, data, etc. which is inputted via the operation input device 40, and controls the operations of the robot 10 and the conveying device 20 according to the instruction, information, data, etc. The robot controller 30 includes a computer. Further, the robot controller 30 may include electric circuitry for controlling electric power supplied to the robot 10 and the conveying device 20, an apparatus for controlling power other than the electric power, such as pneumatic and hydraulic pressure, supplied to the robot 10 and the conveying device 20, and an apparatus for controlling a substance, such as paint, supplied to the robot 10.

For example, the computer of the robot controller 30 includes processing circuitry or circuitry. The circuitry may include the processing circuitry. The processing circuitry or the circuitry includes a processor and a memory device. The processing circuitry or the circuitry transmits to and receives from other devices the instruction, information, data, etc. The processing circuitry or the circuitry accepts inputs of signals from various apparatuses, and outputs a control signal to each controlled target. The memory device may include a memory, a storage, or both of the memory and the storage. Examples of the memory are a RAM (Random Access Memory) which is a volatile semiconductor memory, and a ROM (Read-Only Memory) which is a nonvolatile semiconductor memory. Examples of the storage are a semiconductor memory such as a flash memory, a hard disk drive, and an SSD (Solid State Drive). For example, the memory device stores a program executed by the processing circuitry or the circuitry, various data, etc.

At least some of a plurality of functions of the robot controller 30 may be implemented by collaboration of the processor, the memory, the storage, etc. The processor, and the memory including the RAM and the ROM are included in a computer system. For example, the computer system may realize the function(s) described above by the processor using the RAM as a work area, and executing the program recorded on the ROM. Note that some or all of the function (s) of the robot controller 30 may be realized by the computer system described above, may be realized by hardware circuitry for exclusive use, such as electronic circuitry or integrated circuitry, or may be realized by a combination of the computer system and the hardware circuitry which are described above. The robot controller 30 may perform the processing by a centralized control of a sole computer, or may perform the processing by a distributed control with collaboration of a plurality of computers.

The robot controller 30 is connected with the robot 10, the conveying device 20, and the operation input device 40 wiredly or wirelessly. Communications between these may be any kind of wired communications and wireless communications.

Referring to FIG. 11, one example of a hardware configuration of the robot controller 30 is described. The robot controller 30 includes a CPU (Central Processing Unit) 301 as one example of the processor, a ROM 302 and a RAM 303 as examples of the memory, a memory I/F (Interface) 304, an input/output I/F 305, and a drive I/F 306. These are connected with each other via a bus 30A. The robot controller 30 further includes a memory device 307 connected to the memory I/F 304, a control panel 308 connected to the input/output I/F 305, and drive circuitry 309 and 310 connected to the drive I/F 306. In this embodiment, the robot controller 30 is implemented by a combination of the computer system and the hardware circuitry.

The memory I/F 304 controls reading-out or writing (storing) of data from/to the memory device 307. The memory device 307 may be a memory device built in the robot controller 30, or may be an external memory device. In the latter case, the memory device 307 may be a storage medium, such as a flash memory, a CD-ROM, a CD-R, and a DVD, and a memory device, such as a hard disk drive and an SSD.

The input/output I/F 305 is an interface for communicating a signal etc. with the control panel 308 etc. The control panel 308 is a control panel included in the robot controller 30. The control panel 308 is connected to the operation input device 40, and transmits and receives a signal to/from the operation input device 40.

The drive I/F 306 is an interface for communicating the signal etc. with the drive circuitry 309 and 310. The first drive circuitry 309 controls electric power supplied to a drive which drives each joint of the robotic arm 12. For example, the drive includes a servomotor as an electric motor which generates a driving force. The CPU 301 and the first drive circuitry 309 carry out a servo control of the robotic arm 12. The second drive circuitry 310 controls electric power supplied to an electric motor which drives the end effector 13, and the drives 242 and 251 etc. of the conveying device 20. The CPU 301 and the second drive circuitry 310 carry out the servo control of the drives 242 and 251 to perform the control by using detection signals from the rotation sensor, the current sensor, etc. included in each servomotor as feedback information.

The CPU 301 collectively controls operation of the driving shafts of the motors of the joints of the robotic arm 12, and operation of the driving shafts of the motors of the end effector 13 and the drives 242 and 251. For example, the CPU 301 can control to operate the driving shafts of the motors of the joints of the robotic arm 12, and the driving shafts of the motors of the end effector 13 and drives 242 and 251 in a synchronized fashion. The CPU 301 can control the operation of the driving shafts of the motors of the end effector 13 and the drives 242 and 251 as an external shaft control of the motion control of the driving shafts of the motors of the joints of the robotic arm 12.

(Other Embodiments)

Although in the above the illustrative embodiment of the present disclosure is described, the present disclosure is not limited to the embodiment described above. That is, various modifications and improvements are possible within the scope of the present disclosure. For example, those in which the embodiment is variously modified, and forms which are established by combining components in different embodiments are also encompassed within the scope of the present disclosure.

For example, although in the conveying device 20 according to the illustrative embodiment the first drive 242 is configured to rotate the rotary body 241 so that the second link 243B and the fifth link 244B are rotated together, it is not limited to this configuration. For example, the first drive 242 may be configured to rotate at least one of the connecting parts of the first link structure 243, at least one of the connecting parts of the second link structure 244, or at least one of the connecting parts of the first link structure 243 and at least one of the connecting parts of the second link structure 244. By rotating the connecting parts described above, both the first link structure 243 and the second link structure 244 can be operated.

Although in the conveying device 20 according to the illustrative embodiment the second link 243B and the fifth link 244B are integrated, they may be separated from each other without being limited to the configuration. For example, the first drive 242 may be disposed at each of the first link structure 243 and the second link structure 244.

Although in the conveying device 20 according to the illustrative embodiment the third connecting part 243Ba of the second link 243B and the seventh connecting part 244Ba of the fifth link 244B are configured to rotate on the same circumference of the circle CA, they may rotate on different circumferences without being limited to the configuration.

Although in the conveying device 20 according to the illustrative embodiment the second drive 251 is configured to selectively drive the first holder part 231 and the second holder part 232, it is not limited to this configuration. For example, the second drive 251 may be disposed at each of the first holder part 231 and the second holder part 232.

Although the conveying device 20 according to the illustrative embodiment is configured to include the two link structures 243 and 244, it is not limited to this configuration. For example, the conveying device 20 may include one link structure, or three or more link structures. For example, three or more link structures may be integrally formed with at least one link, like the link structures 243 and 244, and may be configured to operate in a synchronized fashion.

Although in the conveying device 20 according to the illustrative embodiment the loading points P1 are the first point and the fourth point, and the processing points P2 are the second point and the third point, they are not limited to this configuration. For example, the first point and the fourth point may be disposed at different positions, and the second point and the third point may be disposed at different positions. The first point and the second point may not be in the point-symmetrical relationship with respect to the first reference point BPa, and the third point and the fourth point may not be in the point-symmetrical relationship with respect to the first reference point BPa.

Moreover, examples of the respective aspects of the art of the present disclosure are given as follows. The conveying device according to one aspect of the present disclosure is a conveying device that holds and conveys the object, and includes the first link including the first connecting part, the second connecting part located at the position distant from the first connecting part, and the first holder part for the object located on the opposite side of the second connecting part with respect to the first connecting part, the second link including the third connecting part rotatably connected with the first connecting part, the second link being operable so that the third connecting part is rotated centering on the first reference point, the third link including the fourth connecting part rotatably connected with the second connecting part, the third link being operable so that the fourth connecting part is rotated centering on the second reference point located at the position distant from the first reference point, and the first drive that operates the first link to the third link. The first link to the third link move the first holder part between the first point and the second point that are located on opposite sides to each other with respect to the first reference point so that the first holder part approaches the first reference point in association with operation of the second link.

According to the above aspect, the conveying device can move the first holder part between the first point and the second point while causing the first holder part to approach the first reference point. Thus, the conveying device enables reduction of the occupying area for conveyance of the object. Further, in the conveying device, the first holder part is movably supported using the three links which are mutually connected. For example, when one of the three links receives the driving force and operates, the other two links also operate by being interlocked therewith, and thereby the three links move the first holder part. Thus, the first drive may be configured to operate at least one of the three links. Therefore, the conveying device enables a simplified structure for moving the first holder part.

In the conveying device according to one aspect of the present disclosure, one first drive may be disposed so as to drive one or more of the first link to the third link at one of the first connecting part to the fourth connecting part, and the first reference point and the second reference point. According to the above aspect, the conveying device moves the three links using one first drive. Therefore, the conveying device enables a simplified structure for moving the first holder part.

In the conveying device according to one aspect of the present disclosure, the second link distance that is the distance between the third connecting part and the first reference point may be larger than the first reference point distance that is the distance between the first reference point and the second reference point. According to the above aspect, during the conveyance between the first point and the second point, the rotating direction of the first connecting part and the third connecting part centering on the first reference point may be the same as the rotating direction of the first holder part centering on the first connecting part and the third connecting part. For example, when the first connecting part and the third connecting part rotate 180° in the first direction centering on the first reference point, the first holder part may rotate 180° in the first direction centering on the first connecting part and the third connecting part. Therefore, the conveying device can move the first holder part to a rotationally-symmetrical position.

In the conveying device according to one aspect of the present disclosure, the third link distance that is the distance between the fourth connecting part and the second reference point may be larger than the first link distance that is the distance between the first connecting part and the second connecting part. According to the above aspect, the configuration is possible which decreases the angle formed by the part between the first connecting part and the second connecting part in the first link, and the third link during the conveyance between the first point and the second point. For example, the first connecting part can approach the second reference point. Therefore, during the conveyance between the first point and the second point, the conveying device can operate so that the first holder part approaches the first reference point.

In the conveying device according to one aspect of the present disclosure, the first point and the second point may be located symmetrically to each other with respect to the first reference point. The first connecting part position and the second connecting part position that are specific positions of the second connecting part may be located symmetrically to each other with respect to the first reference point. The first connecting part position may be the position of the second connecting part when the first holder part is located at the first point. The second connecting part position may be the position of the second connecting part when the first holder part is located at the second point. According to the above aspect, the first link located at the first connecting part position and the first link located at the second connecting part position may be in a symmetrical relationship with respect to the first reference point. Thus, the conveying device can move the first holder part between the two point-symmetrical positions from the first point toward the second point by causing the second link to rotate the third connecting part by 180°.

In the conveying device according to one aspect of the present disclosure, the first holder part may be rotatable to the first link, and the conveying device may further include the second drive that drives the first holder part. According to the above aspect, by rotating the first holder part, the conveying can change the direction of the object held by the first holder part.

The conveying device according to one aspect of the present disclosure may include the fourth link including the fifth connecting part, the sixth connecting part located at the position distant from the fifth connecting part, and the second holder part for the object located on the opposite side of the sixth connecting part with respect to the fifth connecting part, the fifth link including the seventh connecting part rotatably connected with the fifth connecting part, the fifth link being operable so that the seventh connecting part is rotated centering on the first reference point, and the sixth link including the eighth connecting part rotatably connected with the sixth connecting part, the sixth link being operable so that the eighth connecting part is rotated centering on the third reference point located at the position distant from the first reference point and the second reference point. The fifth link may be integrally formed with the second link so as to rotate centering on the first reference point together with the second link. The fourth link to the sixth link may move the second holder part between the third point and the fourth point that are located on opposite sides to each other with respect to the first reference point so that the second holder part approaches the first reference point in association with operation of the fifth link.

According to the above aspect, the conveying device can operate the fourth link to the sixth link via the fifth link integrated with the second link by operating the first link to the third link using the first drive. Therefore, the conveying device can move the first holder part and the second holder part simultaneously with a simple structure.

In the conveying device according to one aspect of the present disclosure, the first drive may be disposed so as to rotate the second link and the fifth link centering on the first reference point. According to the above aspect, the conveying device can move the first holder part and the second holder part using one first drive. Further, since the first drive drives the second link and the fifth link at the first reference point, the rotational driving force can be given equally to the first link to the third link and the fourth link to the sixth link.

In the conveying device according to one aspect of the present disclosure, the fifth link distance that is the distance between the seventh connecting part and the first reference point may be larger than the second reference point distance that is the distance between the first reference point and the third reference point. According to the above aspect, during the conveyance between the third point and the fourth point, the rotating direction of the fifth connecting part and the seventh connecting part centering on the first reference point may be the same as the rotating direction of the second holder part centering on the fifth connecting part and the seventh connecting part. For example, when the fifth connecting part and the seventh connecting part rotate 180° in the first direction centering on the first reference point, the second holder part may rotate 180° in the first direction centering on the fifth connecting part and the seventh connecting part. Therefore, the conveying device can move the second holder part to rotationally-symmetrical positions with respect to the first reference point.

In the conveying device according to one aspect of the present disclosure, the sixth link distance that is the distance between the eighth connecting part and the third reference point may be larger than the fourth link distance that is the distance between the fifth connecting part and the sixth connecting part. According to the above aspect, the configuration is possible which decreases the angle formed by the part between the fifth connecting part and the sixth connecting part in the fourth link, and the sixth link during the conveyance between the third point and the fourth point. For example, the fifth connecting part can approach the third reference point. Therefore, during the conveyance between the third point and the fourth point, the conveying device can operate so that the second holder part approaches the first reference point.

In the conveying device according to one aspect of the present disclosure, the third point and the fourth point may be located symmetrically to each other with respect to the first reference point. The third connecting part position and the fourth connecting part position that are specific positions of the sixth connecting part may be located symmetrically to each other with respect to the first reference point. The third connecting part position may be the position of the sixth connecting part when the second holder part is located at the third point. The fourth connecting part position may be the position of the sixth connecting part when the second holder part is located at the fourth point. According to the above aspect, the fourth link located at the third connecting part position and the fourth link located at the fourth connecting part position are in a symmetrical relationship with respect to the first reference point. Thus, the conveying device can move the second holder part between the two point-symmetrical positions from the third point toward the fourth point by causing the fifth link to rotate the seventh connecting part by 180°.

In the conveying device according to one aspect of the present disclosure, the third reference point may be located at the opposite side of the second reference point with respect to the first reference point. According to the above aspect, it becomes possible to suppress the interference between the fourth link to the sixth link and the first link to the third link.

In the conveying device according to one aspect of the present disclosure, the fourth link, the fifth link, and the sixth link may include similar configurations to the first link, the second link, and the third link, respectively. According to the above aspect, the conveying device can move the first holder part and the second holder part along similar paths.

In the conveying device according to one aspect of the present disclosure, when the first holder part is located at the first point and the second holder part is located at the third point, the second reference point may be located at the first distance from the second connecting part and the sixth connecting part, and the third reference point may be located at the first distance from the second connecting part and the sixth connecting part, on the opposite side of the second reference point with respect to the first reference point. The third point may be located on the opposite side of the first point with respect to the first reference point.

According to the above aspect, the second reference point and the third reference point may be disposed at opposite sides to each other with respect to the first reference point, the first point and the third point may be disposed at opposite sides to each other with respect to the first reference point, and the second point and the fourth point may be disposed at opposite sides to each other with respect to the first reference point. Further, when the first holder part is located at the first point and the second holder part is located at the third point, both the second connecting part and the sixth connecting part are located at the first distance from the second reference point and the third reference point. Thus, the first link to the third link and the fourth link to the sixth link include point-symmetrical configurations with respect to the first reference point. Therefore, it is possible that the first point and the fourth point are located at similar positions and the second point and the third point are located at similar positions. Thus, the conveying device can move the first holder part and the second holder part between the two points.

The conveying device according to one aspect of the present disclosure may further include the second drive that selectively drives the second holder part and the first holder part. The first holder part may be rotatable to the first link, and the second holder part may be rotatable to the fourth link. According to the above aspect, the conveying device can selectively drive the first holder part and the second holder part by one second drive. It becomes possible to simplify the control system for driving the holder parts.

The robot system according to one aspect of the present disclosure includes the conveying device of one aspect of the present disclosure, the robot including the arm with one or more joints, and that processes the object conveyed by the conveying device, and the robot controller that controls operation of the robot. According to the above aspect, effects similar to the conveying device according to one aspect of the present disclosure are achieved.

In the robot system according to one aspect of the present disclosure, the robot controller may be controllable of the drives so that the driving shafts of the drives operate synchronizedly with each other. The driving shafts of the drives may include the driving shaft of the drive of the joint of the arm, and the driving shaft of the drive of the conveying device. According to the above aspect, the robot and the conveying device can be controlled by utilizing the control system of the robot controller. For example, the robot controller can control the drive of the conveying device as an external shaft.

The functions of the elements disclosed herein can be performed using circuitry or processing circuitry including a general-purpose processor, a dedicated processor, an integrated circuit, an ASIC (Application-Specific Integrated Circuit), a conventional circuit, and/or a combination thereof, which is configured or programmed to execute the disclosed functions. Since the processor includes transistors or other circuitry, it is considered to be the processing circuitry or the circuitry. In the present disclosure, the circuitry, the unit, or the means is hardware which performs the listed functions, or is hardware programmed to perform the listed functions. The hardware may be hardware disclosed herein, or may be other known hardware which are programmed or configured to perform the listed functions. When the hardware is the processor considered to be a kind of circuitry, the circuitry, the means, or the unit is a combination of hardware and software, and the software is used for a configuration of the hardware and/or the processor.

All the numbers used above, such as the order and the quantity, are illustrated in order to concretely explain the technologies of the present disclosure, and therefore, the present disclosure is not limited to the illustrated numbers. Further, the connection relationships between the components are illustrated in order to concretely explain the technologies of the present disclosure, and the connection relationship which realizes the functions of the present disclosure is not limited to those relationships.

DESCRIPTION OF REFERENCE CHARACTERS

1 Robot System
10 Robot
12 Robotic Arm
20 Conveying Device
30 Robot Controller
231 First Holder Part
232 Second Holder Part
242 First Drive
243A First Link
243Aa First Connecting Part
243Ab Second Connecting Part
243B Second Link
243Ba Third Connecting Part
243C Third Link
243Ca Fourth Connecting Part
244A Fourth Link
244Aa Fifth Connecting Part
244Ab Sixth Connecting Part
244B Fifth Link
244Ba Seventh Connecting Part
244C Sixth Link
244Ca Eighth Connecting Part
251 Second Drive
BPa First Reference Point
BPb Second Reference Point
BPc Third Reference Point
LB1 First Reference Point Distance
LB2 Second Reference Point Distance
LL1 First Link Distance
LL2 Second Link Distance
LL3 Third Link Distance
LL4 Fourth Link Distance
LL5 Fifth Link Distance
LL6 Sixth Link Distance
P1 Loading Point (First Point, Fourth Point)
P2 Processing Point (Second Point, Third Point)
W Object

What is claimed is:

1. A conveying device that holds and conveys an object, comprising:
    a first link including a first connecting part, a second connecting part located at a position distant from the first connecting part, and a first holder part for the object located on the opposite side of the second connecting part with respect to the first connecting part;
    a second link including a third connecting part rotatably connected with the first connecting part, the second link being operable so that the third connecting part is rotated centering on a first reference point;
    a third link including a fourth connecting part rotatably connected with the second connecting part, the third link being operable so that the fourth connecting part is rotated centering on a second reference point located at a position distant from the first reference point;
    at least one first drive that operates the first link to the third link, wherein the first link to the third link move the first holder part between a first point and a second point that are located on opposite sides to each other with respect to the first reference point so that the first holder part approaches the first reference point in association with operation of the second link;
    a fourth link including a fifth connecting part, a sixth connecting part located at a position distant from the fifth connecting part, and a second holder part for the object located on the opposite side of the sixth connecting part with respect to the fifth connecting part;
    a fifth link including a seventh connecting part rotatably connected with the fifth connecting part, the fifth link being operable so that the seventh connecting part is rotated centering on a first reference point; and
    a sixth link including an eighth connecting part rotatably connected with the sixth connecting part, the sixth link being operable so that the eighth connecting part is rotated centering on a third reference point located at a position distant from the first reference point and the second reference point, wherein
    the fifth link is integrally formed with the second link so as to rotate centering on the first reference point together with the second link,
    the fourth link to the sixth link move the second holder part between a third point and a fourth point that are located on opposite sides to each other with respect to the first reference point so that the second holder part approaches the first reference point in association with operation of the fifth link,
    the fourth link, the fifth link, and the sixth link include similar configurations to the first link, the second link, and the third link, respectively,
    when the first holder part is located at the first point and the second holder part is located at the third point, the second reference point is located at a first distance from the second connecting part and the sixth connecting part, and the third reference point is located at the first distance from the second connecting part and the sixth connecting part, on the opposite side of the second reference point with respect to the first reference point, and
    the third point is located on the opposite side of the first point with respect to the first reference point.

2. The conveying device of claim 1, wherein one of the at least one first drive is disposed so as to drive one or more of the first link to the third link at one of the first connecting part to the fourth connecting part, and the first reference point and the second reference point.

3. The conveying device of claim 1, wherein a second link distance that is a distance between the third connecting part and the first reference point is larger than a first reference point distance that is a distance between the first reference point and the second reference point.

4. The conveying device of claim 3, wherein a third link distance that is a distance between the fourth connecting part and the second reference point is larger than a first link distance that is a distance between the first connecting part and the second connecting part.

5. The conveying device of claim 1, wherein the first point and the second point are located symmetrically to each other with respect to the first reference point,
    wherein a first connecting part position and a second connecting part position that are specific positions of the second connecting part are located symmetrically to each other with respect to the first reference point,
    wherein the first connecting part position is a position of the second connecting part when the first holder part is located at the first point, and
    wherein the second connecting part position is a position of the second connecting part when the first holder part is located at the second point.

6. The conveying device of claim 1, wherein the first holder part is rotatable to the first link, and
    wherein the conveying device further comprises a second drive that drives the first holder part.

7. The conveying device of claim 1, wherein the at least one first drive is disposed so as to rotate the second link and the fifth link centering on the first reference point.

8. The conveying device of claim 1, wherein a fifth link distance that is a distance between the seventh connecting part and the first reference point is larger than a second reference point distance that is a distance between the first reference point and the third reference point.

9. The conveying device of claim 8, wherein a sixth link distance that is a distance between the eighth connecting part and the third reference point is larger than a fourth link distance that is a distance between the fifth connecting part and the sixth connecting part.

10. The conveying device of claim 1, wherein the third point and the fourth point are located symmetrically to each other with respect to the first reference point,
wherein a third connecting part position and a fourth connecting part position that are specific positions of the sixth connecting part are located symmetrically to each other with respect to the first reference point,
wherein the third connecting part position is a position of the sixth connecting part when the second holder part is located at the third point, and
wherein the fourth connecting part position is a position of the sixth connecting part when the second holder part is located at the fourth point.

11. The conveying device of claim 1, further comprising a second drive that selectively drives the second holder part and the first holder part,
wherein the first holder part is rotatable to the first link, and
wherein the second holder part is rotatable to the fourth link.

12. A robot system, comprising:
the conveying device of claim 1;
a robot including an arm with one or more joints, and that processes an object conveyed by the conveying device; and
a robot controller that controls operation of the robot.

13. The robot system of claim 12, wherein the robot controller is controllable of the drives so that driving shafts of the drives operate in sync with each other, and
wherein the driving shafts of the drives include a driving shaft of the drive of the joint of the arm, and a driving shaft of the drive of the conveying device.

* * * * *